United States Patent [19]

Harris et al.

[11] Patent Number: 4,830,557
[45] Date of Patent: May 16, 1989

[54] SELF-ALIGNING FLOATING NUT FASTENER

[75] Inventors: David J. Harris, Fairfield, Ohio; Richard L. Elgin, San Diego, Calif.

[73] Assignee: General Electric Company, Cincinnati, Ohio

[21] Appl. No.: 149,038

[22] Filed: Jan. 26, 1988

[51] Int. Cl.⁴ .................... F16B 39/28; F16B 39/284
[52] U.S. Cl. .................... 411/113; 411/112; 411/183; 411/537
[58] Field of Search ............ 411/84, 85, 103, 104, 411/112, 113, 537, 173–175, 968, 969, 999, 183

[56] References Cited

U.S. PATENT DOCUMENTS

| | | |
|---|---|---|
| 2,243,923 | 6/1941 | Swanstrom ................ 411/113 |
| 3,118,480 | 1/1964 | Kreider ................... 411/173 |
| 4,193,435 | 3/1980 | Charles et al. ............ 411/113 |
| 4,676,706 | 6/1987 | Inaba ..................... 411/175 |

FOREIGN PATENT DOCUMENTS 666313 6/1979 U.S.S.R. .................... 411/537
495976 11/1938 United Kingdom ........... 411/113

*Primary Examiner*—Neill R. Wilson
*Attorney, Agent, or Firm*—Lawrence Derek P.; Steven J. Rosen

[57] ABSTRACT

An improved nut fastener is utilize with a back-up plate to perfect a bolted flange joint. The fastener includes a cage having a planar body affixed to the back-up plate in bearing engagement with a surface thereof. Opposed sides upstanding from the cage body are configured to loosely capture a spherical faced washer, a spherical faced nut, and a nut anti-torque collar in self-aligning relation with a joint bolt hole. An extension of either the cage body or the collar is configured to engage the back-up plate in a manner to inhibit rotation of the cage.

22 Claims, 3 Drawing Sheets

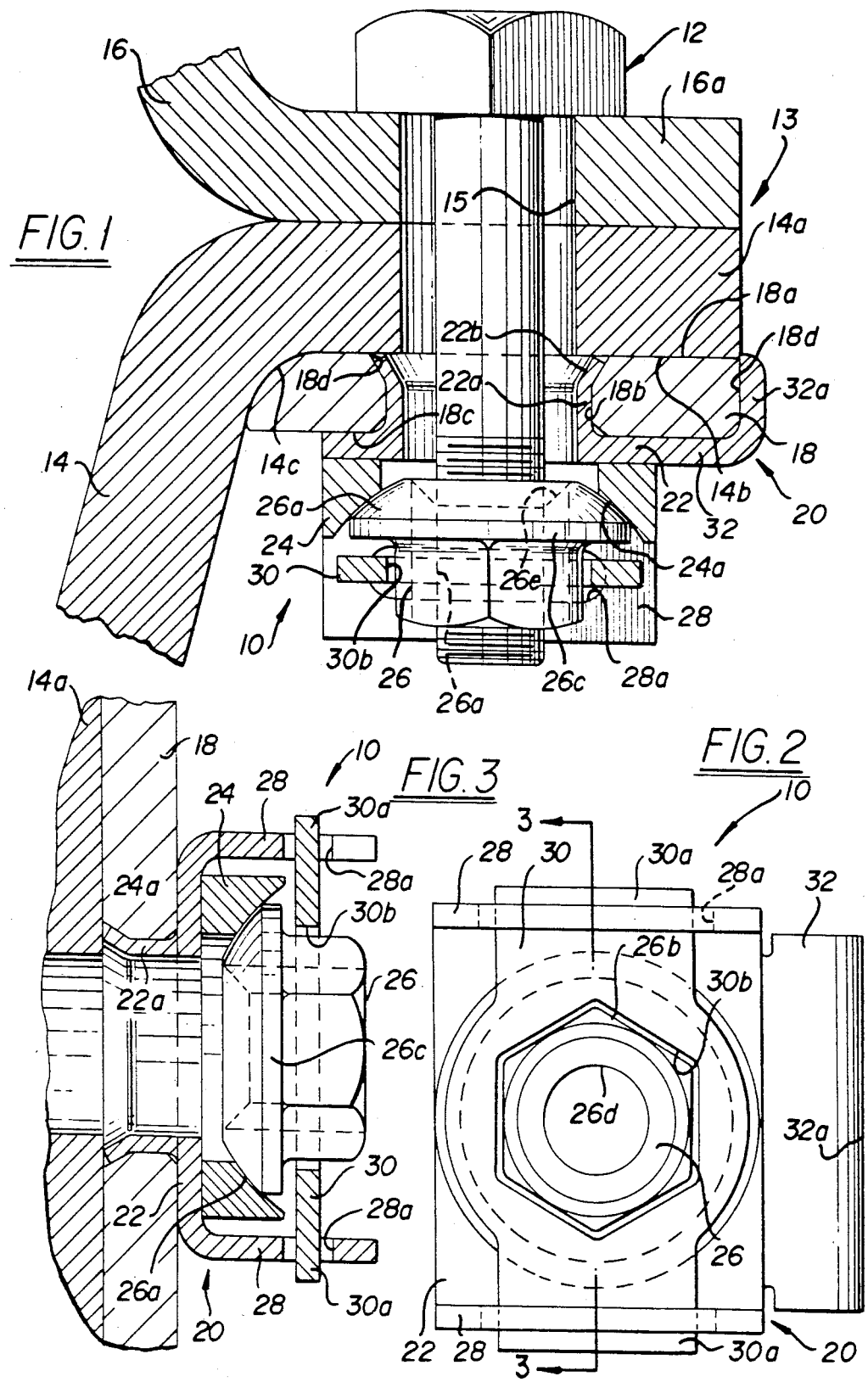

SELF-ALIGNING FLOATING NUT FASTENER

BACKGROUND OF THE INVENTION

The Government has rights in this invention pursuant to Contract No. F33657-81-C-0067.

The invention herein described was made in the course of or under a contract, or a subcontract thereunder, with the United States Department of the Air Force.

The present invention generally relates to fastening devices and particularly to a caged nut fastener for use with a bolt in the blind clamping together of at least two parts to form a joint.

In the production of jet engines it is often necessary to join duct sections together at their flanges ends. In some cases, these duct sections are formed of a high temperature composite material, such as, for example, PMR15 graphite. Unfortunately, composite sections, when subjected to loading, have a tendency to delaminate at their flange radius with a consequent degradation in strength. To alleviate this problem, so called "back-up" metal plates are incorporated in the flange joint to, in effect, fill the flange radius portion and thus maintain it in compression under load. In addition, these back-up plates serve the important function of spreading the bolt clamping load so as to prevent crushing of the composite material in the vicinity of the bolt hole. Heretofore, these back-up plates had to be spot faced or machined to ensure that the nut fastener bearing surface thereof is precisely normal to the bolt axis and thus prevent excessive bending stress in the bolt as it is torqued to the requisite joint clamping pressure. Also, the nut bearing surface of the back-up plate should be precisely parallel to the engaging surfaces of the plate and composite flange to ensure uniform bolt load spreading.

Other major considerations are the fixation of the nut fastener in effective alignment with the bolt hole formed in the joint parts and the anti-torquing of both the nut and the nut cage so that blind assembly and disassembly can be performed in an efficient and reliable manner.

It is accordingly an object of the present invention to provide an improved nut fastener for perfecting a bolted joint.

An additional object is to provide a nut fastener of the above-character, wherein the nut is caged in a manner to accommodate limited, floating, planar movement.

A further object is to provide a nut fastener of the above-character, wherein the nut is caged in an angular self-aligning manner, thus eliminating the need to spot face the fastener bearing surface.

An additional object is to provide a nut fastener of the above character, wherein both the nut and its cage are constrained against rotation (anti-torqued) in an efficient and practical manner.

Yet another object is to provide a nut fastener of the above-character, which is affixed to one of the joint parts in an efficient and practical manner.

A still further object is to provide a nut fastener of the above-character, wherein at least some of its parts are commercially available.

Another object is to provide a nut fastener of the above-character, which is inexpensive to manufacture, lightweight, compact, and easy to use.

Other objects of the invention will in part be obvious and in part appear hereinafter.

SUMMARY OF THE INVENTION

In accordance with the present invention, there is provided an improved nut fastener which includes a cage for capturing a nut anti-torque collar, and a nut and a washer with their respective spherical surfaces in substantially nested relation. The cage is affixed to one of the joint parts with the nut and washer in substantial alignment with the joint bolt hole. An extension of either the cage or the collar is fashioned to engage one of the joint parts to resist fastener turning during blind assembly of the bolted joint.

The invention accordingly comprises the features of construction, combination of elements, and arrangements of parts, all of which will be exemplified in the constructions hereinafter set forth, and the scope of the invention will be indicated in the claims.

For a fuller understanding of the nature and objects of the invention, reference should be had to the following detailed description taken in conjunction with the accompanying drawings, in which:

FIG. 1 is a sectional view of a nut fastener constructed in accordance with one embodiment of the present invention;

FIG. 2 is a plan view of the nut fastener of FIG. 1;

FIG. 3 is a sectional view taken along line 3—3 of FIG. 2;

Corresponding reference numerals refer to like parts throughout the several views of the drawings.

DETAIL DESCRIPTION

Figure 4:
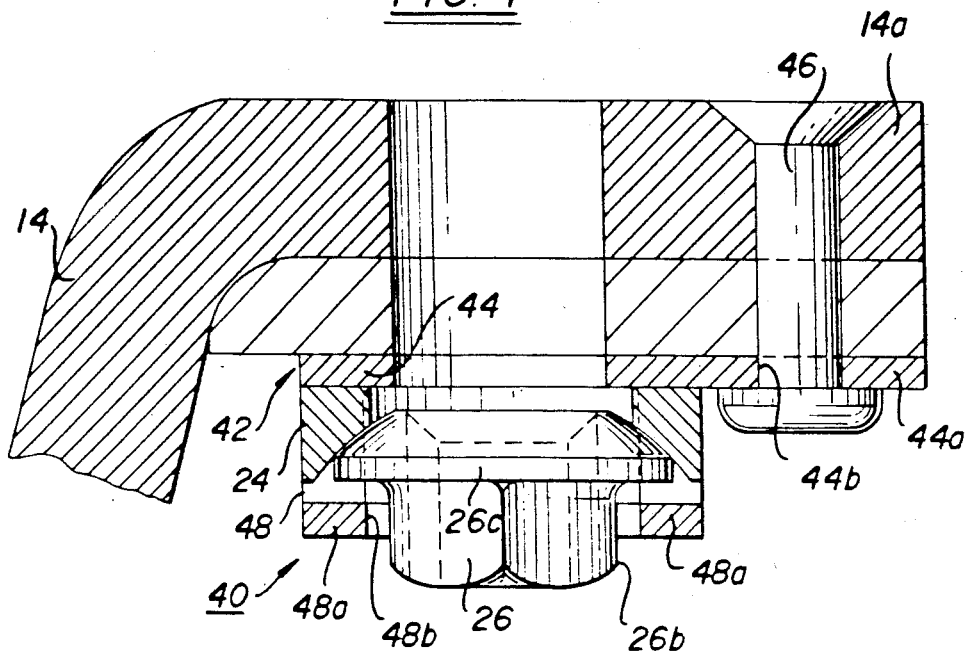
FIG. 4 is a sectional view of a nut fastener constructed in accordance with an alternate embodiment of the present invention.

Referring to the drawings, the nut fastener embodiment of the present invention depicted in FIGS. 1-3 and generally indicated at 10 is illustrated as acting in conjunction with a bolt 12 to secure a bolted joint, generally indicated at 13, between mating flanges 14a and 16a of, for example, a high temperature composite duct section 14 and a metal duct section 16, respectively, of a jet engine exhaust system. Also incorporated in joint 13 is a metal back-up plate 18 with its backing surface 18a conformed to and clamped against the exposed composite flange surface 14b including the curved transition surface portion 14c between the composite flange and composite duct section. As noted above, the backing afforded by plate 18 at this flange transistion radius maintains the portion of the composite duct in compression under load, and thus delamination thereat is avoided in service. This backing plate also spreads the bolt load radially out from the bolt hole 15 in the composite flange 14a, thus to avoid crushing the composite material adjacent thereto.

As variously seen in FIGS. 1-3, nut fastener 10 includes a cage, generally indicated at 20, which may be formed as a metal stamping. Drawn from the planar body 22 of cage 20 is a tubular section 22a which is sized for close fitting reception in a bolt hole 18b drilled through back-up plate 18. To affix the cage to back-up plate 18 with the upper surface of the cage body 22 seated against the lower surface 18c of this joint part, the terminal portion 22b of tubular section 22a is swaged into locking engagement with the chamfered portion 18d of bolt hole 18b (FIG. 1). Seated against the lower surface of cage body 22 is the flat upper surface of a washer 24 whose opposed lower surface 24a bounding the washer central opening 24b is of a truncated spherical configuration. Nestable with this washer seating surface 24a is a complementary, truncated spherical bearing surface 26a of a nut 26. Advantageously, washer 24 and nut 26 with a self-locating feature (not shown) are commercially available items.

To loosely capture washer 24 and nut 26 in their positions illustrated in FIGS. 1 and 3, cage 20 is integrally formed with a pair of sides 28 which are bent out of the plane of cage body 22 into opposed, upstanding positions essentially normal thereto. The sides are provided with opposed slots 28a through which are received the opposed wings 30a of an anti-toruqe collar 30. This collar is provided with a central opening 30b through which the body 26b of nut 26 is loosely received. The configuration of this collar opening generally conforms to the non-circular peripheral surface configuration of the bolt body 26b, which in the illustrated embodiment are both hexagonal. With collar 30 so positioned, it is in lapping relation with a rim 26c extending radially beyond nut body 26b. It is thus seen that cage 20 and collar 30 cooperate to loosely capture washer 24 and nut 26 in substantial axial alignment with bolt hole 15. This capturing is such that the bolt and washer are free to shift positions in response to the threading of bolt 12 through the nut bore 26d so as to become precisely aligned with the bolt axis. This self-alignment is facilitated by flaring the nut bore entry, as illustrated at 26e. Threading of the bolt through the nut to perfect joint 13 can thus be achieved in facile, non-binding fashion. In addition, the cage and collar inhibit turing of the nut as the bolt is torqued up to enable assembly in those situations where nut fastener 10 is inaccessible, i.e., "blind". It still remains to inhibit nut fastener turning during bolt assembly, and to this end planar body 22 of cage 20 is integrally provided with an extension or leg 32 whose end portion is bent around the corner of back-up plate 18 to provide a foot 32a for engaging the edge surface 18d of the back-up plate which is normal to the cage body.

It will be noted that, by virtue of the spherical bearing and seating surfaces of the nut and washer, a swivel action is achieved to accommodate the situation where the cage bearing surface 18c of back-up plate 18 is not precisely normal to the bolt axis. This swivel action also accommodates the situation where the bolt axis is not exactly parallel to the bolt hole axis. In either case, the spherical faced nut automatically angularly adjusts its position against the spherical faced washer as the bolt is torqued up, and thus the bolt load is still substantially uniformly distributed by the washer to the cage body and back-up plate. Also, excessive bending stress in the bolt is avoided. Since the back-up plate surface 18c need not be precisely normal to the bolt axis and also parallel to the composite flange surface 14b, spot facing or precision machining of surface 18c becomes unnecessary, which is a significant cost savings.

Figure 5:
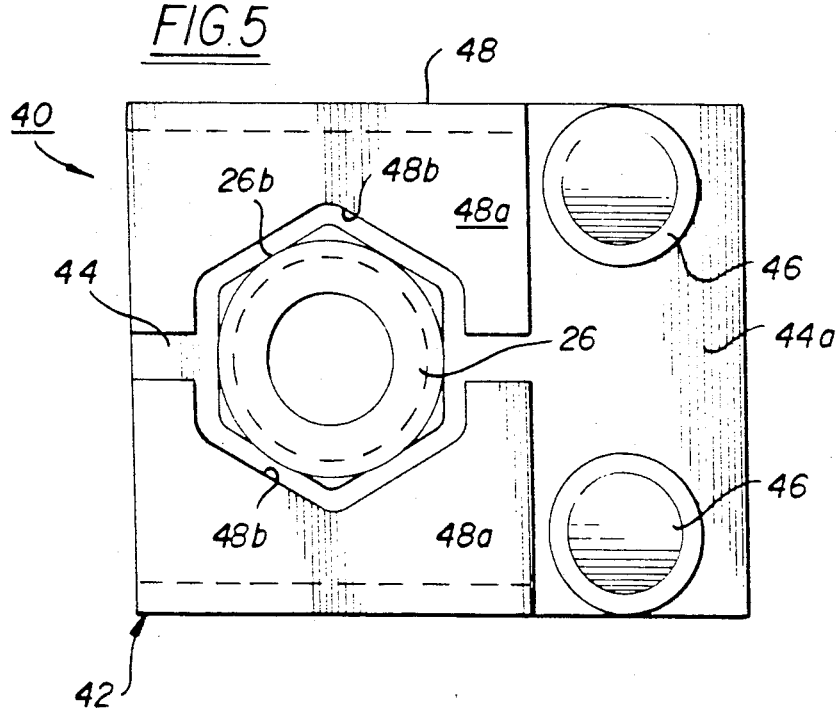
FIG. 5 is a plan view of the nut fastener of FIG. 4.

In the embodiment of the invention seen in FIGS. 4 and 5, a nut fastener, generally indicated at 40, utilizes a simplified form of cage generally indicated at 42 and having a planar body 44 with an integral extension 44a thereof provided with a pair of holes 44b for accepting rivets 46 affixing the nut fastener to back-up plate 18. It will be appreciated that these rivets also serve with cage extension 44a as anti-turn means to inhibit rotation of nut fastener 40 during bolt assembly. Obviously, other forms of fastener elements such as screws could be utilized.

To loosely capture spherical faced washer 24 and spherical faced nut 26, cage 42 is provided with a pair of opposed sides 48 bent out of the plane of planar body 44 into positions normal thereto. Rather than a separate nut anti-torque collar as in nut fastener 10 of FIGS. 1-3, the cage of nut fastener 40 is integrally equipped with a nut anti-torque collar by bending the terminal portions 48a of sides 48 toward each other to present semi-hexagonal-shaped edge reliefs 44b in close surrounding relation with the hexagonal peripheral surface of nut body 26b and in lapping relation with nut rim 26c. Thus rotation of the captured nut during bolt assembly is prevented by the anti-torque collar portion of cage 42.

Figure 6:
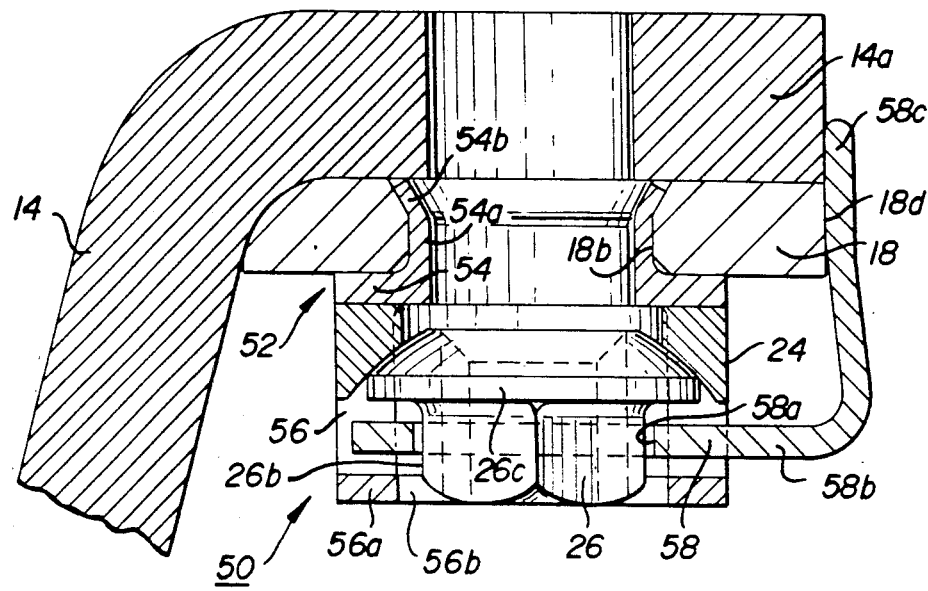
FIG. 6 is a sectional view of a nut fastener constructed in accordance with yet another embodiment of the present invention.
Figure 7:
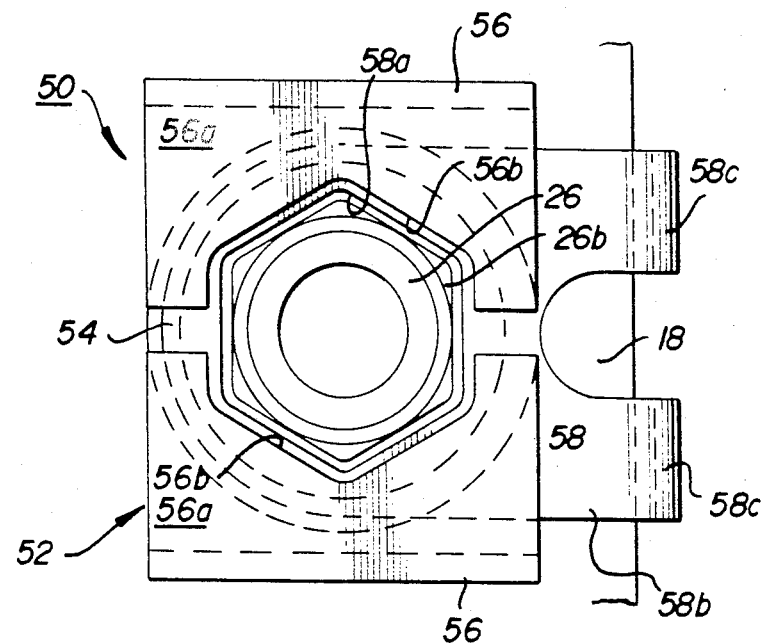
FIG. 7 is a plan view of the nut fastener of FIG. 6.

In the embodiment of the invention seen in FIGS. 6 and 7, a nut fastener, generally indicated at 50, includes a cage 52 having a planar body 54 from which is drawn a tubular section 54a for close fitting receipt in the bolt hole 18b drilled in back-up plate 18. The terminal end portion 54b is swaged into engagement with the chamfered portion of bolt hole 18b to affix nut fastener 50 to the back-up plate in the same manner as nut fastener 10 of FIGS. 1-3. To loosely capture spherical faced washer 24 and spherical faced nut 26, a pair of opposed sides 56 are bent out of the plane of body 54 into positions normal thereto. The terminal portions 56a of these sides are bent over to present semi-hexagonal-shaped edge reliefs 56b in close surrounding relation to the hexagonal peripheral surface of nut body 26b for nut anti-torque purposes and in lapping relation with nut rim 26c. In addition to the nut and washer, cage 52 also captures a suplemental nut anti-torque collar 58 having a hexagonal shaped opening 58a into which the body 26b of nut 26 is received as in the case of nut fastener 10 of FIGS. 1-3. In departure from this previously disclosed embodiment, the anti-turn function for nut fastener 50 is performed by an extension of nut anti-torque collar 58, rather than an extension of the cage planar body. Thus, as seen in FIGS. 6 and 7, collar 58 is provided with an extension 58b projecting outwardly through an open side of cage 52 and is bifurcated to provide a pair of tangs 58c which are bend up into engaging relation with edge surface 18d of back-up plate 18 to inhibit turning of nut fastener 50 during bolt assembly. It will be appreciated that capture of the washer, nut and collar by cage 52 could be achieved by bending over free end portions of the cage sides so as to lap only the edge portions of the collar, in which case collar 58 alone would serve the requisite nut anti-torque function.

From the foregoing description, it is seen that all of the functional benefits ascribed above to nut fastener 10 of FIGS. 1-3 are applicable as well to nut fastener 40 of FIGS. 4 and 5 and nut fastener 50 of FIGS. 6 and 7.

It is thus seen that the objects set forth above, including those made apparent from the preceding description, are efficiently attained, and, since certain changes may be made in the above constructions without departing from the scope of the invention, it is intended that all matter contained in the above description or shown in the accompanying drawings shall be interpreted as illustrative and not in a limiting sense.

Having described the invention, what is claimed as new and desired to secure by Letter Patent is:

1. A self-aligning, floating nut fastener for use with a bolt in clamping at least two parts together to form a joint, said fastener comprising, in combination:
   A. a washer having a spherical surface portion;
   B. a nut having a spherical surface portion complementing said washer spherical surface portion, and a non-circular peripheral surface portion;
   C. a collar having an opening conforming to said nut peripheral surface portion;
   D. a cage for capturing said nut, washer and collar with said nut and washer spherical surface portions in substantially nested relation and with said nut peripheral surface portion received in said collar opening such as to inhibit rotation of said nut;
   E. means affixing said cage to one of the joint parts; and
   F. anti-turn means integrally formed as an extension of one of said cage and collar for engaging one of the joint parts to resist rotation of said cage.

2. A self-aligning, floating nut fastener for use with a bolt in clamping at least two parts together to form a joint, said fastener comprising, in combination:
   A. a washer having a spherical surface portion;
   B. a nut having a spherical surface portion complimenting said washer spherical surface portion, and a non-circular peripheral surface portion;
   C. a collar having an opening conforming to said nut peripheral surface portion;
   D. a cage for capturing said nut, washer and collar with said nut and washer spherical surface portions in substantially nested relation and with said nut peripheral surface portion received in said collar opening such as to inhibit rotation of said nut;
   E. means affixing said cage to one of the joint parts;
   F. anti-turn means integrally formed as an extension of one of said cage and collar for engaging one of the joint parts to resist rotation of said cage, and said cage includes a planar body with a pair of opposed sides upstanding therefrom and with opposed slots formed in said sides, said collar including opposed wings received in said side slots.

3. The nut fastener defined in claim 1, wherein said cage includes a planar body, said affixing means comprising a tubular section drawn from said planar body for receipt in a bolt hole formed in the one joint part, the end portion of said tubular section being swaged into locking engagement with the one joint part.

4. The nut fastener defined in claim 1, wherein said cage includes a planar body, and said anti-turn means comprises an extension of said planar cage body bent over into engagement with an edge surface of the one joint part normal to said cage planar body.

5. The nut fastener defined in claim 1, wherein said cage includes a planar body, and said affixing and anti-turn means comprises an extension of said cage planar body with holes therein for accepting fastener elements carried by the one joint part.

6. A self-aligning, floating nut fastener for use with a bolt in clamping at least two parts together to form a joint, said fastener comprising, in combination:
   A. a washer having a spherical surface portion;
   B. a nut having a spherical surface portion complimenting said washer spherical surface portion, and a non-circular peripheral surface portio;
   C. a collar having an opening conforming to said nut peripheral surface portion;
   D. a cage for capturing said nut, washer and collar with said nut and washer spherical surface portions in substantially nested relation and with said nut peripheral surface portion received in said collar opening such as to inhibit rotation of said nut;
   E. means affixing said cage to one of the joint parts;
   F. anti-turn means integrally formed as an extension of one of said cage and collar for engaging one of the joint parts to resist rotation of said cage, and said cage includes a planar body with a pair of opposed sides upstanding therefrom, said anti-turn means comprises an extension of said collar bent over into engagement with an edge surface of the one joint part normal to said cage planar body.

7. The nut fastener defined in claim 6, wherein said cage further includes extensions of said sides bent over into lapping relation with said collar and in rotation inhibiting relation with said nut peripheral surface.

8. The nut fastener defined in claim 7, wherein said cage includes a planar body, said affixing means comprising a tubular section drawn from said planar body for receipt in a bolt hole formed in the one joint part, the end portion of said tubular section being swaged into locking engagement with the one joint part.

9. A self-aligning, floating nut fastener for use with a bolt in clamping the flanges of two parts together to form a bolted joint, said fastener comprising, in combination:
   A. a back-up plate having a first surface conforming to the surface configuration of one of the flanges and an opposed second surface;
   B. a washer having a spherical surface portion;
   C. a nut having a spherical surface portion complementing said washer spherical surface portion, and a non-circular peripheral surface portion;
   D. a collar having an opening conforming to said nut peripheral surface portion;
   E. a cage for capturing said nut, washer and collar with said nut and washer spherical surface portions in substantially nested relation and with said nut peripheral surface portion received in said collar opening such as to inhibit rotation of said nut; and
   F. means for affixing said cage to said back-up plate and for resisting rotation of said cage, whereby upon threading a bolt through said nut to form a bolted joint, said first surface of said back-up plate is clamped against the one flange surface and said second surface thereof is clamped against said cage.

10. The nut fastener defined in claim 9, wherein said cage includes a planar body bearing against said second back-up plate surface, and said affixing and rotation resisting means includes an extension of said cage planar body and fastener elements securing said extension to said back-up plate.

11. A self-aligning, floating nut fastener for use with a bolt in clamping the flanges of two parts together to form a bolted joint, said fastener comprising, in combination:
   A. a back-up plate having a first surface conforming to the surface configuration of one of the flanges and an opposed second surface;
   B. a washer having a spherical surface portion;
   C. a nut having a spherical surface portion complementing said washer spherical surface portion, and a non-circular peripheral surface portion;
   D. a collar having an opening conforming to said nut peripheral surface portion;

E. a cage for capturing said nut, washer and collar with said nut and washer spherical surface portions in substantially nested relation and with said nut peripheral surface portion received in said collar opening such as to inhibit rotation of said nut;

F. means for affixing said cage to said back-up plate and for resisting rotation of said cage, whereby upon threading a bolt through said nut to form a bolted joint, said first surface of said back-up plate is clamped against the one flange surface and said second surface thereof is claimed against said cage; and G. said cage includes a planar body bearing against said second back-up plate surface, said planar body having a pair of opposed sides upstanding therefrom with opposed slots formed therein, said collar including opposed wings received in said side slots.

12. The nut fastener defined in claim 11 wherein said affixing and rotation resisting means comprising a tubular section drawn from said planar body for receipt in a bolt hole formed in said back-up plate, the end portion of said tubular section being swaged into locking engagement with said back-up plate.

13. The nut fastener defined in claim 12, wherein said affixing and rotation resisting means further includes an extension of said planar cage body bent over into engagement with an edge surface of said back-up plate normal to said cage planar body.

14. A self-aligning, floating nut fastener for use with a bolt in clamping the flanges of two parts together to form a bolted joint, said fastener comprising, in combination:

A. a back-up plate having a first surface conforming to the surface configuration of one of the flanges and an opposed second surface;

B. a washer having a spherical surface portion;

C. a nut having a spherical surface portion complimenting said washer spherical surface portion, and a non-circular peripheral surface portion;

D. a collar having an opening conforming to said nut peripheral surface portion;

E. a cage for capturing said nut, washer and collar with said nut and washer spherical surface portions in substantially nested relation and with said nut peripheral surface portion received in said collar opening such as to inhibit rotation of said nut;

F. means for affixing said cage to said back-up plate and for resisting rotation of the said cage, whereby upon threading a bolt through said nut to form a bolted joint, said first surface of said back-up plate is clamped against the one flange surface and said second surface thereof is claimed against said cage; and G. said cage includes a planar body bearing against said second back-up plate surface, said planar body including a pair of opposed sides upstanding therefrom, and said affixing and rotation resisting means including an extension of said collar bent over into engagement with an edge surface of said back-up plate normal to said cage planar body to inhibit rotation of said cage.

15. The nut fastener defined in claim 14, wherein said affixing and rotation resisting means further includes extensions of said sides bent over into lapping relation with said collar and in rotatio inhibiting relation with said nut peripheral surface.

16. The nut fastener defined in claim 15, wherein said affixing and rotation resisting means further includes a tubular section drawn from said planar body for receipt in a bolt hole formed in said back-up plate, the end portion of said tubular section being swaged into locking engagement with said back-up plate.

17. A self-aligning, floating nut fastener for use with a bolt in clamping at least two parts together to form a joint, said fastener comprising, in combination:

A. a washer having a spherical surface portion;

B. a nut having a spherical surface portion complementing said washer spherical surface portion, and a non-circular peripheral surface portion;

C. a collar having an opening conforming to said nut peripheral surface portion;

D. a cage for capturing said nut and washer with said nut and washer spherical surface portions in substantially nested relation and said collar attached to said cage with said nut peripheral surface portion received in said collar opening such as to inhibit rotation of said nut;

E. means affixing said cage to one of the joint parts; and

F. anti-turn means integrally formed as an extension of one of said cage and collar for engaging one of the joint parts to resist rotation of said cage.

18. The nut fastener defined in claim 17, wherein said cage includes a planar body, and said affixing and anti-turn means comprises an extension of said cage planar body with holes therein for accepting fastener elements carried by the one joint part.

19. The nut fastener defined in claim 17 wherein said cage includes a planar body with a pair of opposed sides upstanding therefrom, said collar being formed as bent over extensions of said sides.

20. A self-aligning, floating nut fastener for use with a bolt in clamping the flanges of two parts together to form a bolted joint, said fastener comprising, in combination:

A. a back-up plate having a first surface conforming to the surface configuration of one of the flanges and an opposed second surface;

B. a washer having a spherical surface portion;

C. a nut having a spherical surface portion complementing said washer spherical surface portion, and a non-circular peripheral surface portion;

D. a collar having an opening conforming to said nut peripheral surface portion;

E. a cage for capturing said nut and washer with said nut and washer spherical surface portions in substantially nested relation and said collar attached to said cage with said nut peripheral surface portion received in said collar opening such as to inhibit rotation of said nut;

F. means for affixing said cage to said back-up plate and for resisting rotation of said cage, whereby upon threading a bolt through said nut to form a bolted joint, said first surface of said back-up plate is clamped against the one flange surface and said second surface thereof is claimed against said cage.

21. The nut fastener defined in claim 20, wherein said cage includes a planar body bearing against said second back-up plate surface, and said affixing and rotation resisting means includes an extension of said cage planar body and fastener elements securing said extension to said back-up plate.

22. The nut fastener defined in claim 20, wherein said cage further includes a pair of opposed sides upstanding from said planar body, and said collar formed as bent over extensions of said sides.

* * * * *